United States Patent
Bowrin et al.

(10) Patent No.: US 11,256,391 B2
(45) Date of Patent: Feb. 22, 2022

(54) MOBILE USER INTERFACE FOR DISPLAYING HETEROGENEOUS ITEMS INTERLEAVED BY COMMON DATA TYPE

(71) Applicant: ServiceNow, Inc., Santa Clara, CA (US)

(72) Inventors: Sean Andrew Bradley Bowrin, Oceanside, CA (US); Maor Cohen, Jerusalem (IL); Brian Javier Dyk, Ramat Gan (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/538,583

(22) Filed: Aug. 12, 2019

(65) Prior Publication Data

US 2021/0048927 A1 Feb. 18, 2021

(51) Int. Cl.
| | |
|---|---|
| *G06F 7/36* | (2006.01) |
| *G06F 3/0482* | (2013.01) |
| *H04L 41/22* | (2022.01) |
| *G06F 16/22* | (2019.01) |
| *G06F 9/451* | (2018.01) |
| *H04L 67/56* | (2022.01) |
| *H04L 67/10* | (2022.01) |

(52) U.S. Cl.
CPC .............. *G06F 3/0482* (2013.01); *G06F 7/36* (2013.01); *G06F 9/451* (2018.02); *G06F 16/2282* (2019.01); *H04L 41/22* (2013.01); *H04L 67/10* (2013.01); *H04L 67/28* (2013.01)

(58) Field of Classification Search
CPC . G06F 7/16; G06F 7/36; G06F 16/248; G06F 16/26; G06F 16/338; G06F 16/34
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |

(Continued)

OTHER PUBLICATIONS

Madrid Mobile Configuration and Navigation, Servicenow Documentation, May 14, 2019.

*Primary Examiner* — Alvin H Tan
(74) *Attorney, Agent, or Firm* — Fletcher Yoder PC

(57) ABSTRACT

An embodiment may involve: transmitting a first graphical user interface (GUI) that allows selection of a plurality of item streams for a mobile user interface; receiving a selection of a first item stream; transmitting a second GUI, where the first item stream is populated from a first database table and the second GUI allows selection of a first field from the first database table; receiving a selection of a second item stream; transmitting the second GUI, where the second item stream is populated from a second database table and the second GUI allows selection of a second field from the second database table, where the first and second fields are of a common type; and transmitting, to a mobile device, the mobile user interface with items from the first and second item streams sorted according to values in the first and second fields.

19 Claims, 14 Drawing Sheets

(56) References Cited

U.S. PATENT DOCUMENTS

| | | | | |
|---|---|---|---|---|
| 7,028,301 | B2 | 4/2006 | Ding | |
| 7,062,683 | B2 | 6/2006 | Warpenburg | |
| 7,131,037 | B1 | 10/2006 | LeFaive | |
| 7,162,511 | B2 * | 1/2007 | Lunenfeld | G06Q 30/0601 709/203 |
| 7,170,864 | B2 | 1/2007 | Matharu | |
| 7,350,209 | B2 | 3/2008 | Shum | |
| 7,392,300 | B2 | 6/2008 | Anantharangachar | |
| 7,610,512 | B2 | 10/2009 | Gerber | |
| 7,617,073 | B2 | 11/2009 | Trinon | |
| 7,685,167 | B2 | 3/2010 | Mueller | |
| 7,689,628 | B2 | 3/2010 | Garg | |
| 7,716,353 | B2 | 5/2010 | Golovinsky | |
| 7,769,718 | B2 | 8/2010 | Murley | |
| 7,783,744 | B2 | 8/2010 | Garg | |
| 7,890,802 | B2 | 2/2011 | Gerber | |
| 7,925,981 | B2 | 4/2011 | Pourheidari | |
| 7,930,396 | B2 | 4/2011 | Trinon | |
| 7,933,927 | B2 | 4/2011 | Dee | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,082,222 | B2 | 12/2011 | Rangarajan | |
| 8,195,641 | B2 * | 6/2012 | Rucker | G06F 16/2423 707/713 |
| 8,224,683 | B2 * | 7/2012 | Manos | G06Q 10/0631 705/7.15 |
| 8,266,096 | B2 | 9/2012 | Navarrete | |
| 8,266,683 | B2 | 9/2012 | Navarrete | |
| 8,380,645 | B2 | 2/2013 | Kowalski | |
| 8,402,127 | B2 | 3/2013 | Solin | |
| 8,457,928 | B2 | 6/2013 | Dang | |
| 8,478,569 | B2 | 7/2013 | Scarpelli | |
| 8,554,750 | B2 | 10/2013 | Rangaranjan | |
| 8,612,408 | B2 | 12/2013 | Trinon | |
| 8,646,093 | B2 | 2/2014 | Myers | |
| 8,674,992 | B2 | 3/2014 | Poston | |
| 8,689,241 | B2 | 4/2014 | Naik | |
| 8,743,121 | B2 | 6/2014 | De Peuter | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,887,133 | B2 | 11/2014 | Behnia | |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Apte | |
| 9,122,552 | B2 | 9/2015 | Whitney | |
| 9,137,115 | B2 | 9/2015 | Mayfield | |
| 9,239,857 | B2 | 1/2016 | Trinon | |
| 9,317,327 | B2 | 4/2016 | Apte | |
| 9,323,801 | B2 | 4/2016 | Morozov | |
| 9,363,252 | B2 | 6/2016 | Mueller | |
| 9,412,084 | B2 | 9/2016 | Kowalski | |
| 9,467,344 | B2 | 10/2016 | Gere | |
| 9,535,737 | B2 | 1/2017 | Joy | |
| 9,557,969 | B2 | 1/2017 | Sharma | |
| 9,613,070 | B2 | 4/2017 | Kumar | |
| 9,633,025 | B2 * | 4/2017 | Gokhale | G06F 16/122 |
| 9,645,833 | B2 | 5/2017 | Mueller | |
| 9,654,473 | B2 | 5/2017 | Miller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,819,729 | B2 | 11/2017 | Moon | |
| 9,852,165 | B2 | 12/2017 | Morozov | |
| 10,002,203 | B2 | 6/2018 | George | |
| 2005/0080805 | A1 * | 4/2005 | Haeberle | G06Q 10/10 |
| 2008/0281836 | A1 * | 11/2008 | Dykstra-Erickson | G06F 16/48 |
| 2013/0086161 | A1 * | 4/2013 | Avrahami | H04W 4/21 709/204 |
| 2016/0171122 | A1 * | 6/2016 | Tonshal | G06F 16/90335 707/771 |

* cited by examiner

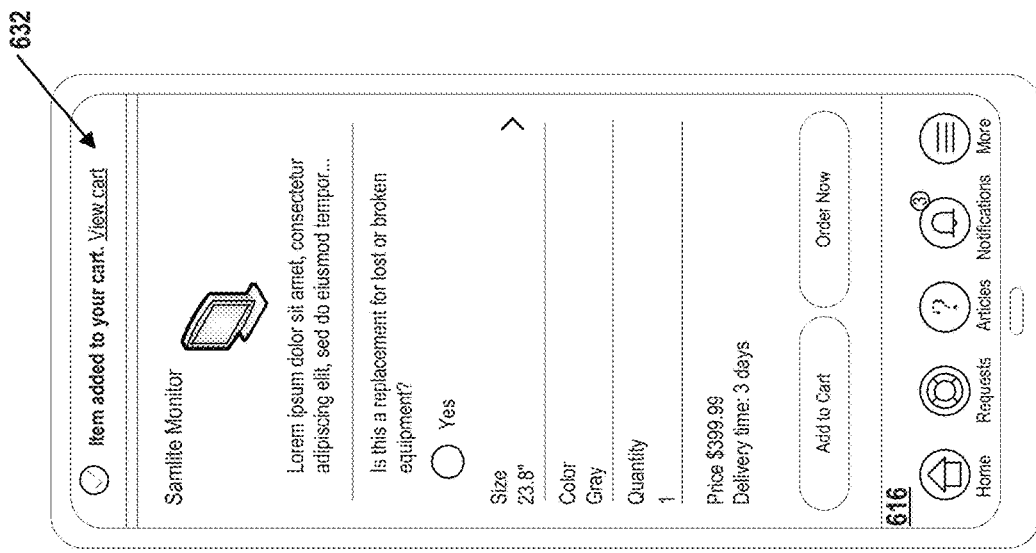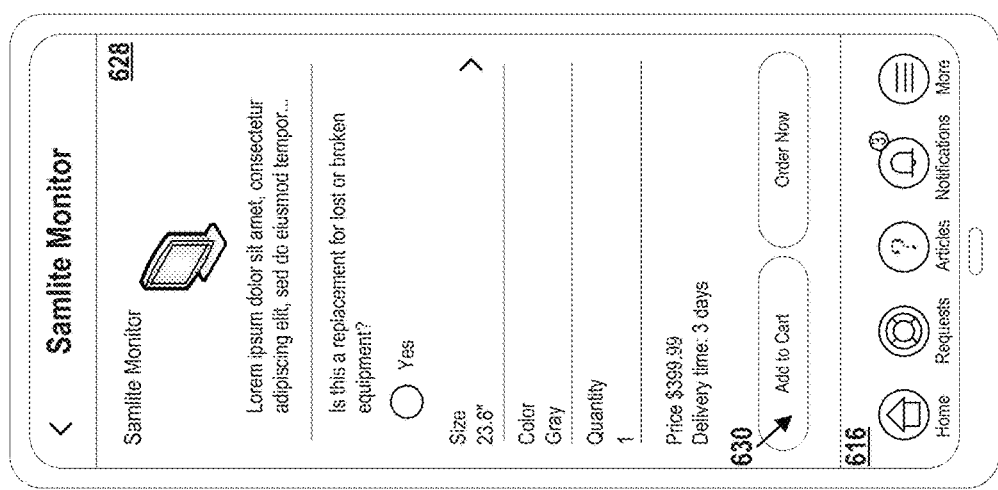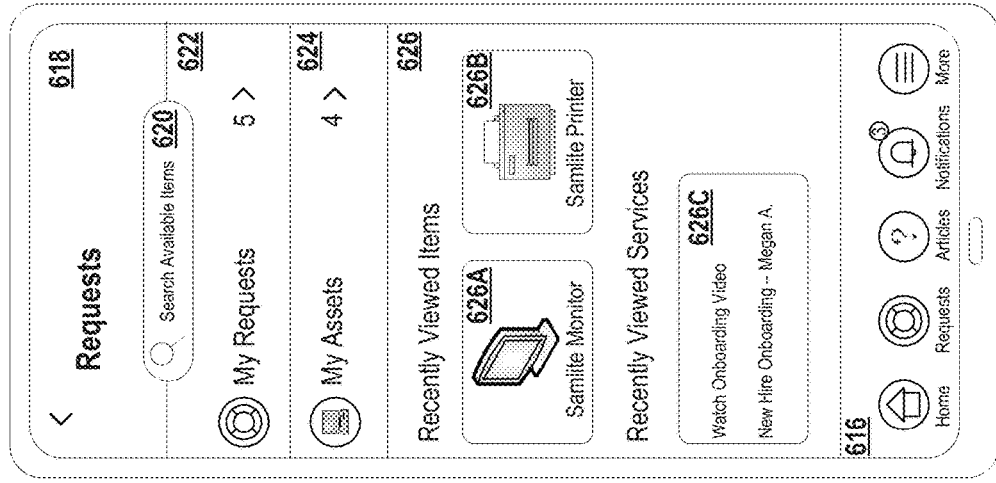
FIG. 6B

MOBILE USER INTERFACE FOR DISPLAYING HETEROGENEOUS ITEMS INTERLEAVED BY COMMON DATA TYPE

BACKGROUND

Users in large-scale enterprises typically use their mobile devices to find company information such as policies and/or request enterprise-related actions and tasks, such as submitting work orders or completing human resource forms. These mobile devices may display representations of graphical user interfaces through which the user can complete a task. However, displays on mobile devices have limited screen space. As a result, it may be difficult to display information in the graphical user interfaces in an efficient manner, making it harder for users to quickly view and navigate the information.

SUMMARY

Enterprise management may involve assigning enterprise-related actions to a number of different types of users for completion, such as completing human resource forms, employee training, and delivering computer systems. Enterprise management may also involve receiving enterprise-related requests from users for fulfillment, such as service and/or hardware requests.

These enterprise-related actions can be viewed by employees in a number of different ways, including via a mobile device. However, mobile devices have limited screen size, which may result in a daunting, non-user-friendly experience when trying to view and locate certain enterprise-related actions and requests. Due to this limited size, the graphical user interfaces (GUIs) displaying these actions and requests are typically limited to displaying either one type of item or another, instead of displaying all relevant items on the same screen of a GUI.

In order to remedy this problem, the embodiments herein provide for web-based interfaces that allow enterprise managers to configure GUIs for display on a mobile device with a small screen. For instance, an enterprise manager may determine that a particular screen of the GUI should display incidents (e.g., IT service requests) along with user item requests (e.g., new hardware requests). Typically, this is difficult to implement because incidents and item requests (as well as other enterprise actions or requests) are stored in separate database tables, and it is challenging to sort the combined information in an automated and intelligible fashion. But through the use of heterogeneous item streams keyed off of fields with a common data type, the GUI can display graphical elements that represent information located in different database tables in one, easily-accessible and easily-navigable list.

This list of graphical elements can be sorted and displayed based on a number of criteria, such as when the items therein were created or last updated. This may be particularly beneficial when displaying the list on a mobile device with a small screen size, as it allows a user to access information from different sources without the need to navigate to multiple panes. This is particularly useful in an enterprise context because it allows users to quickly identify their actions and requests on enterprise-issued or personal mobile devices.

Accordingly, a first example embodiment may involve transmitting, by one or more server devices and to a client device associated with a managed network, a representation of a first GUI, where the first GUI contains elements that allow selection of a plurality of item streams for a segment of a mobile user interface, where the one or more server devices are within a computational instance of a remote network management platform, and where the computational instance is associated with the managed network and contains one or more databases. The first example embodiment may also involve, in response to receiving, from the client device, a selection of a first item stream from the plurality of item streams, transmitting, to the client device, a first representation of a second GUI, where the first item stream is populated from a first database table of the one or more databases, and where the first representation of the second GUI contains elements that allow selection of a first field from the first database table. The first example embodiment may also involve, in response to receiving, from the client device, a selection of a second item stream from the plurality of item streams, transmitting, to the client device, a second representation of the second GUI, where the second item stream is populated from a second database table of the one or more databases, where the second representation of the second GUI contains elements that allow selection of a second field from the second database table, and where the first field and the second field are of a common data type. The first example embodiment may also involve transmitting, to a mobile device associated with the managed network, the mobile user interface, where the segment of the mobile user interface linearly orders items from the first item stream and the second item stream, and where the items are alphanumerically sorted according to respective values in the first field and the second field.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts custom request panes of the personalized GUI, in accordance with example embodiments.

FIG. 6C depicts detailed custom request panes of the personalized GUI, in accordance with example embodiments.

FIG. 7C depicts a data item management pane of an item stream management GUI, in accordance with example embodiments.

DETAILED DESCRIPTION

Figure 1:
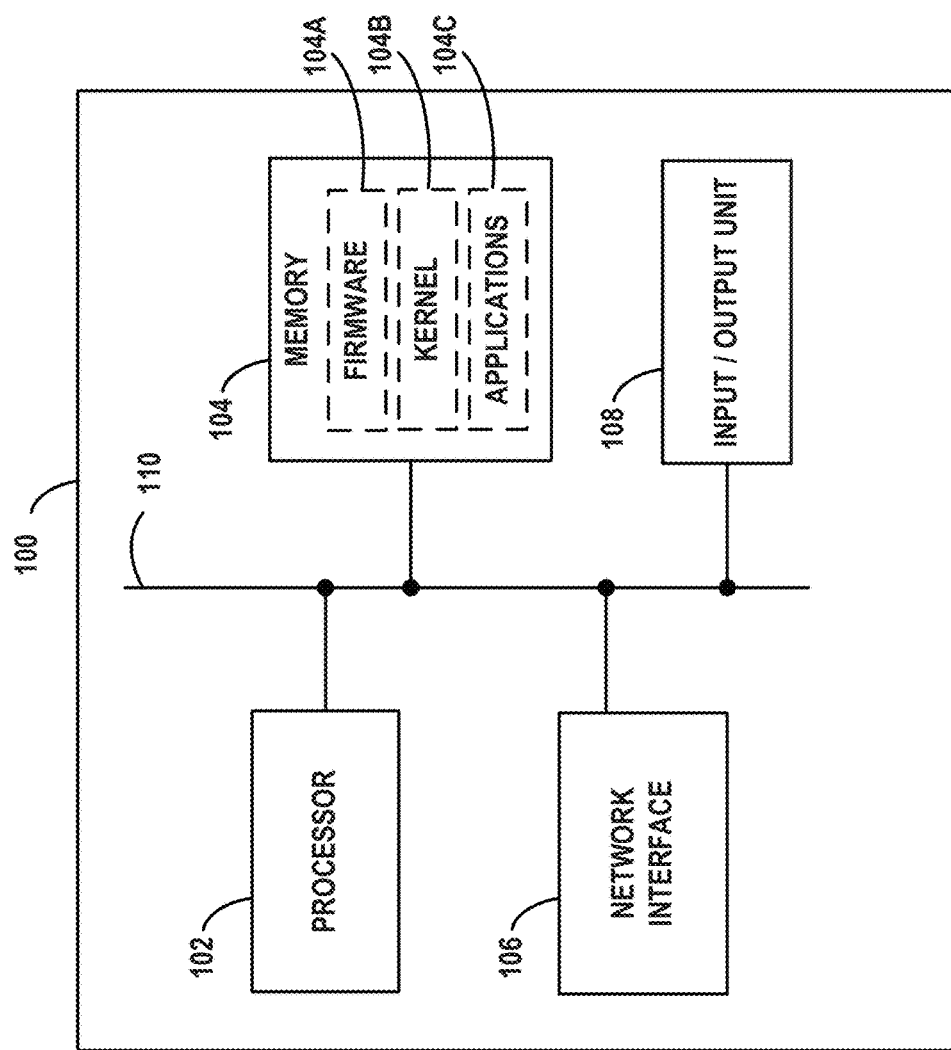
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
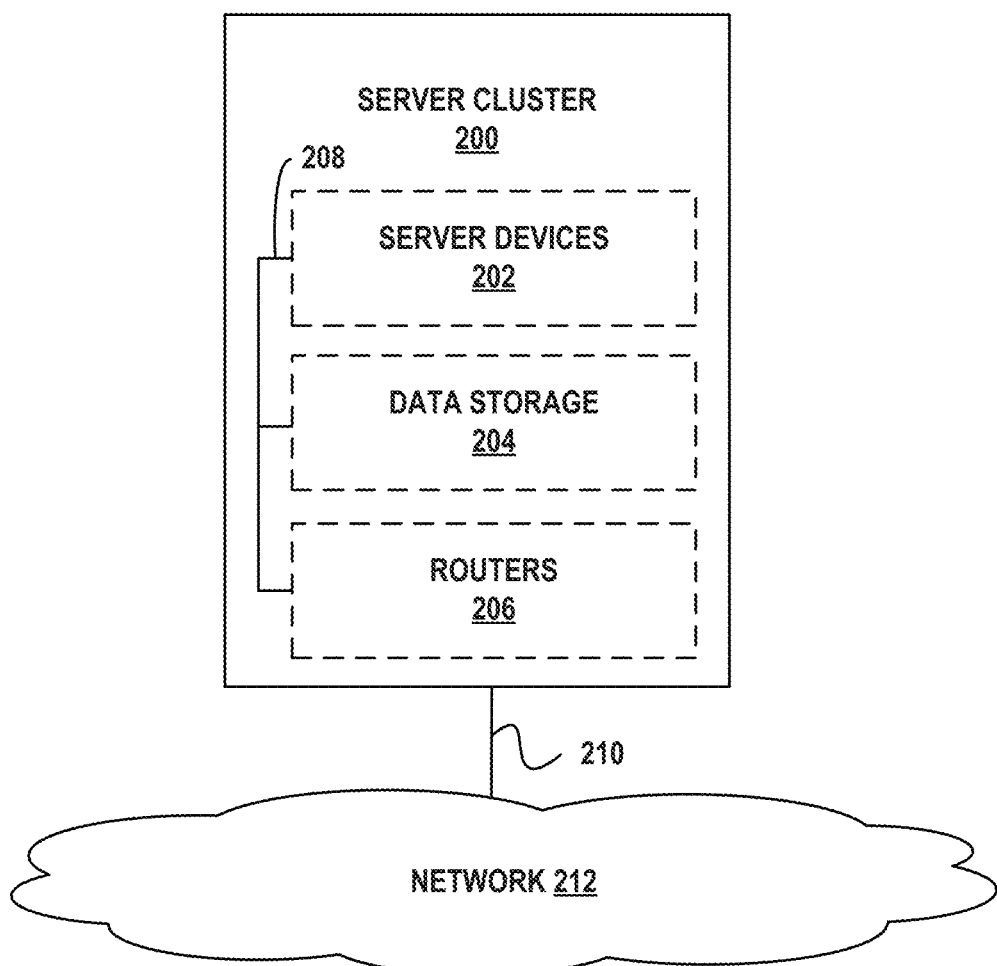
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
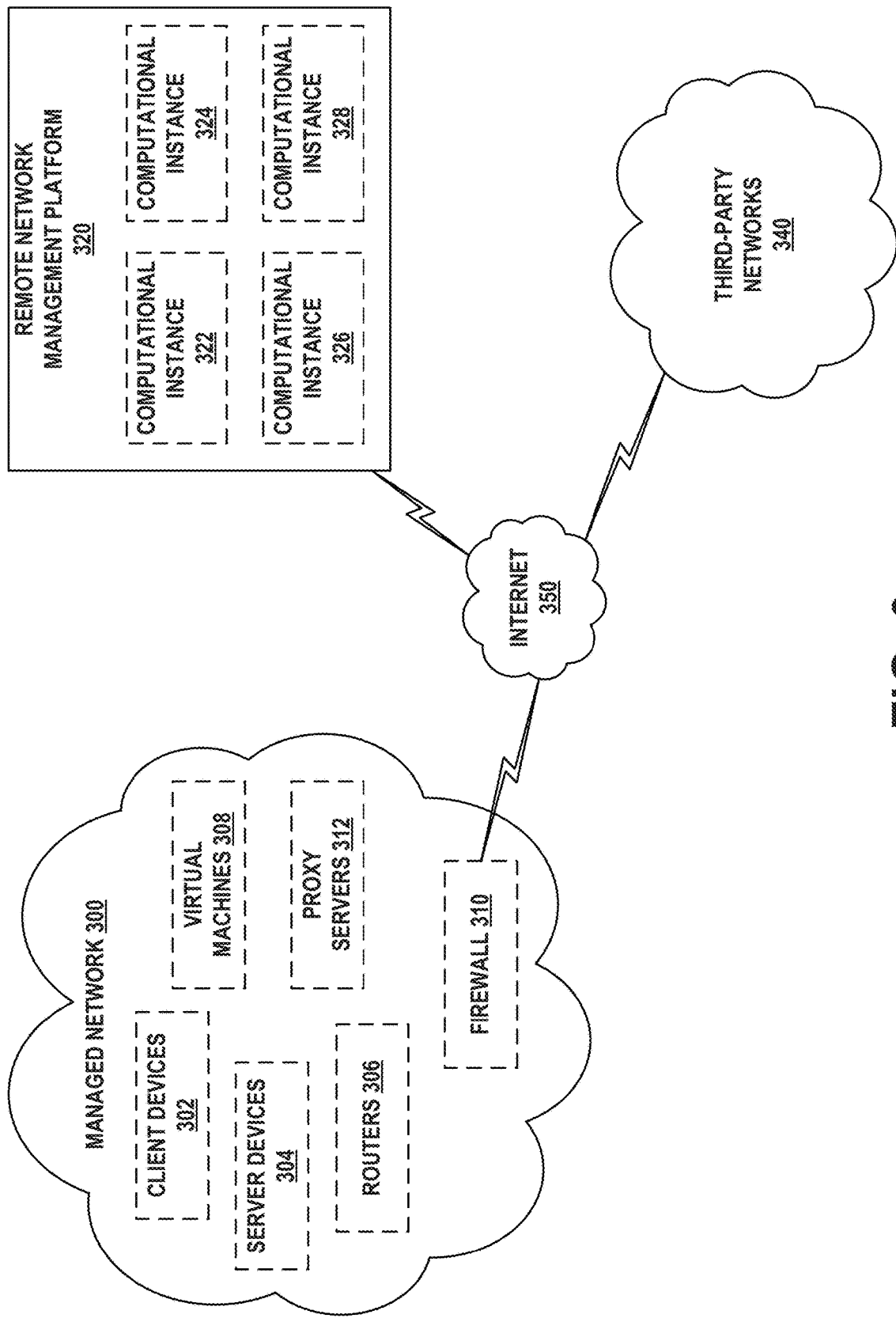
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (e.g., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (e.g., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
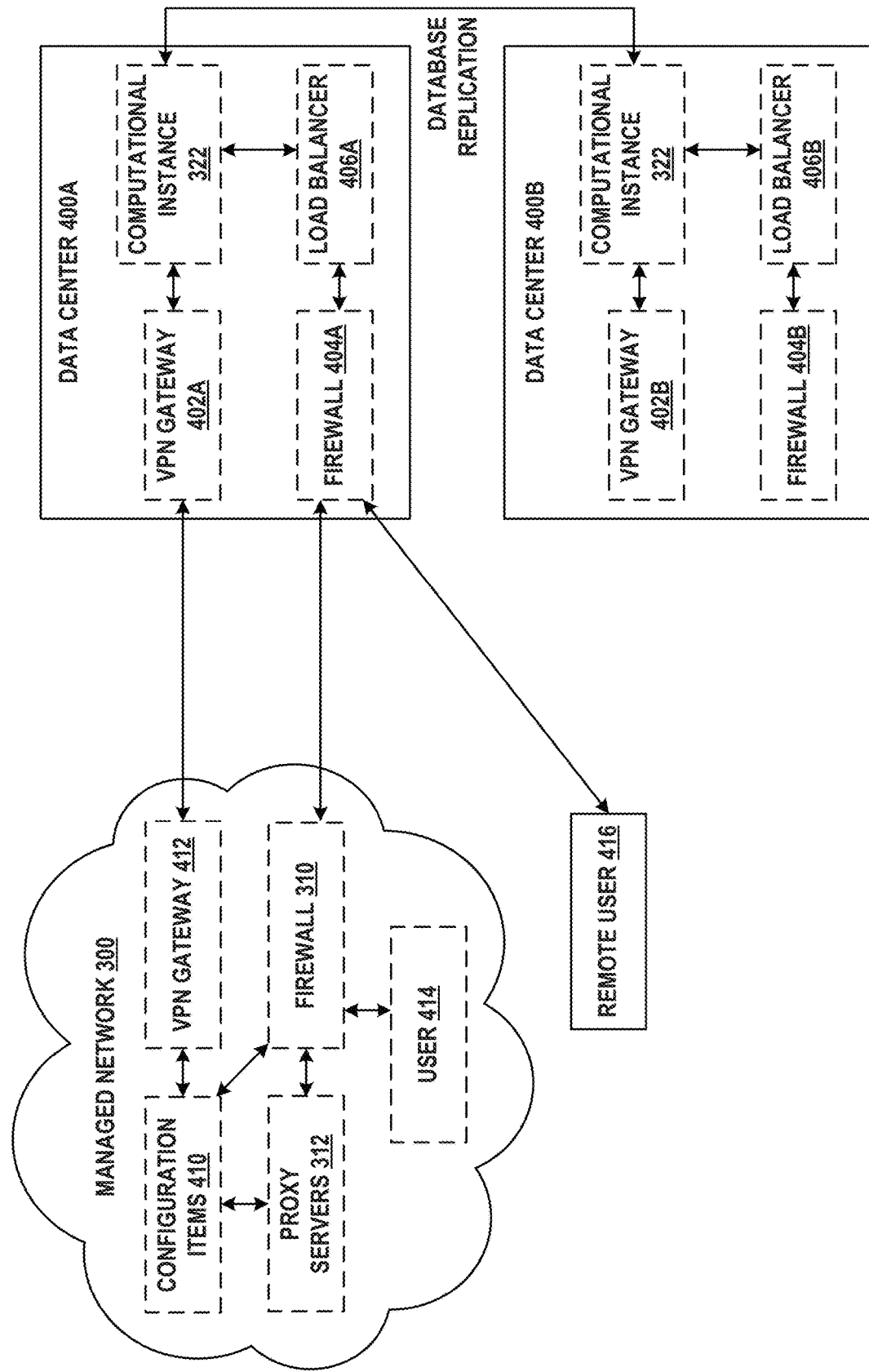
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
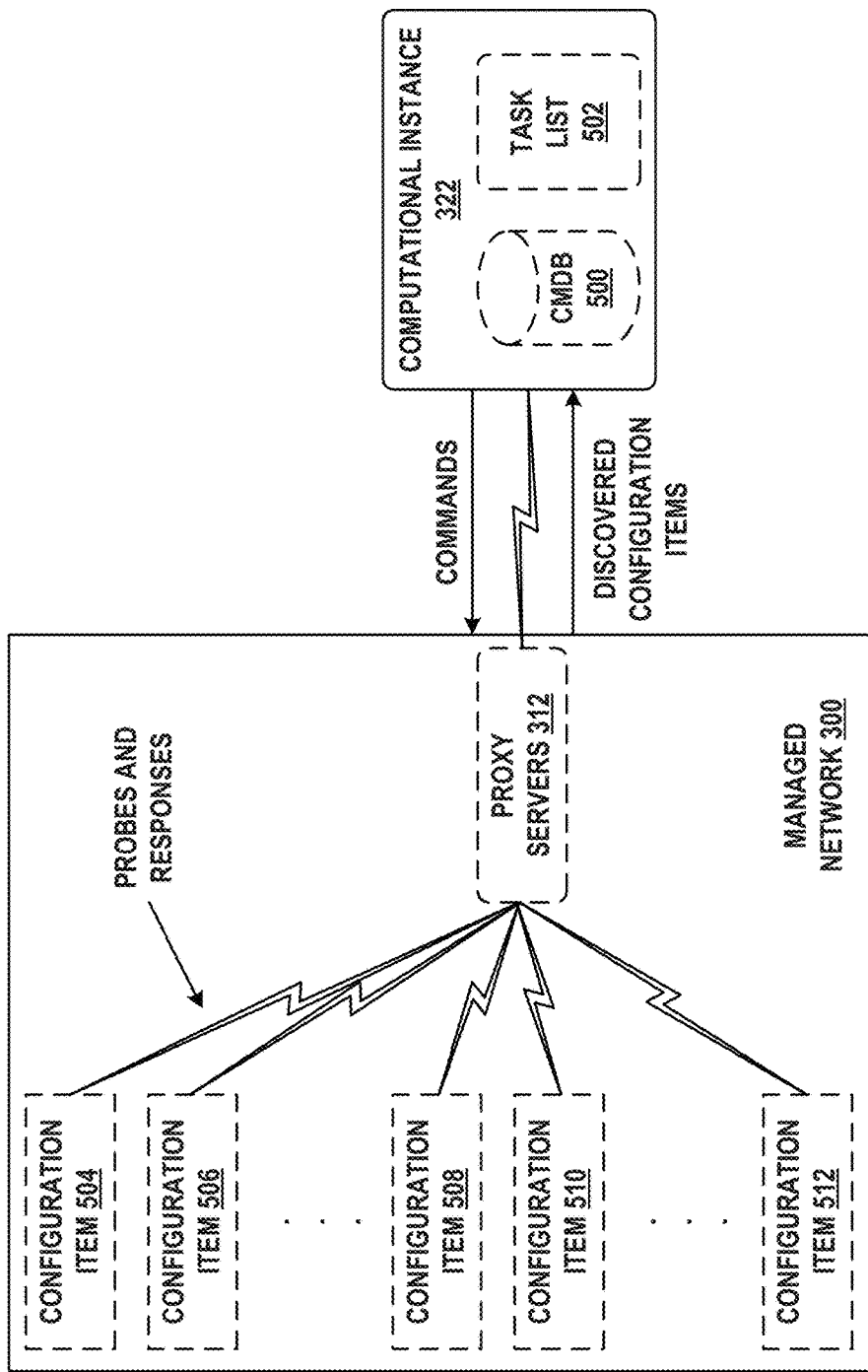
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
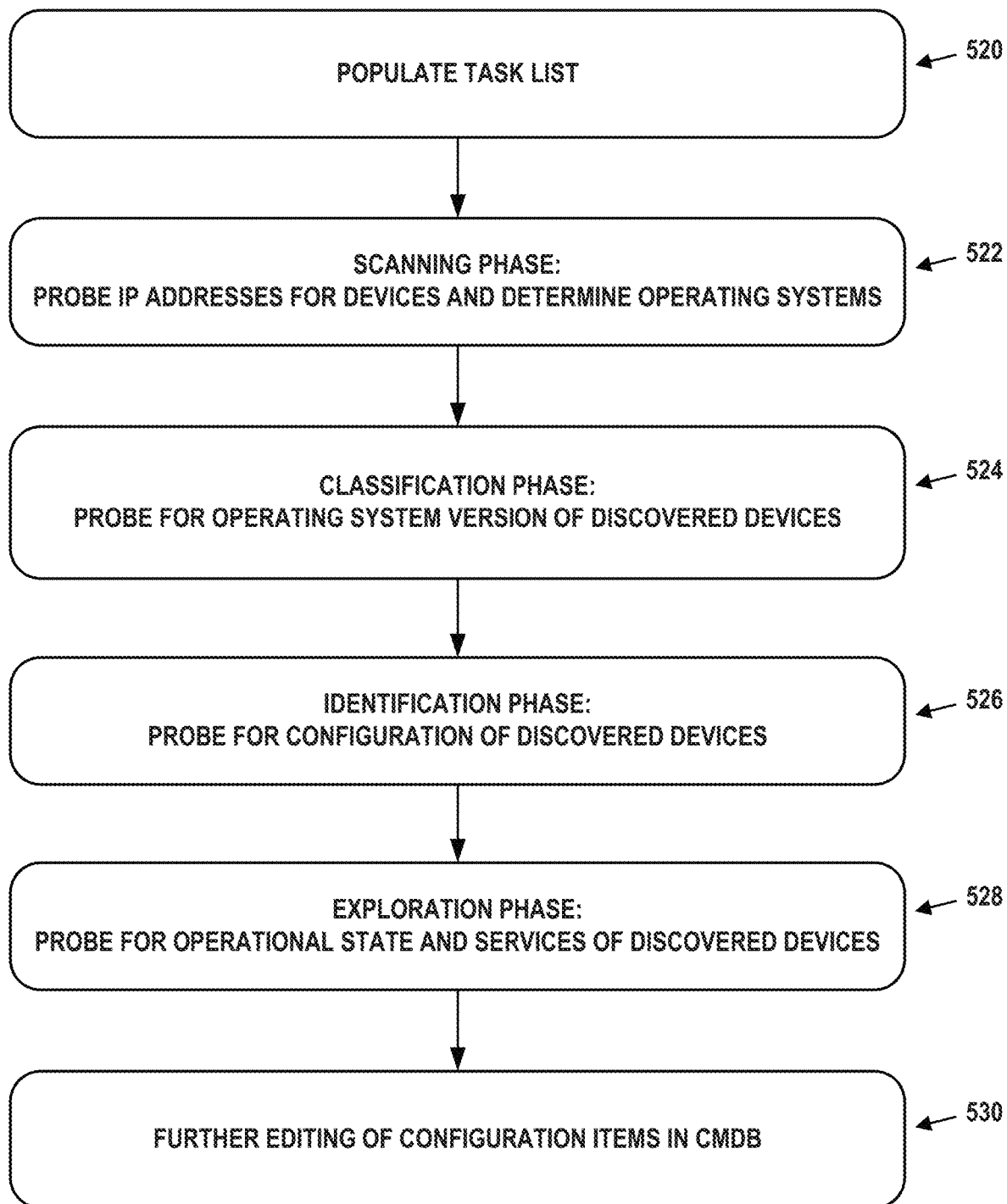
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Personalized Graphical User Interfaces for Enterprise-Related Tasks and Actions As described herein, the term "pane" may refer to a GUI component that contains one or more locations in which to display information, and/or zero or more user-selectable items such as buttons or tabs. In some embodiments, a pane may be equivalent to, or contained within, a page or a GUI window, though such a window may contain multiple panes. Buttons and/or tabs may be graphical control elements that display additional information within the pane. The GUIs and/or panes described herein may be provided to users when they access a computational instance on a remote network management platform, such as computational instance 322 within remote network management platform 320 as described in FIG. 3, or any other server device.

Some embodiments described herein pertain to web-based GUIs and native application-based GUIs. A web-based GUI may include a number of panes accessible on any enterprise-related or personal device via Internet 350 or an intranet. Interacting with a pane of a web-based GUI may cause the submission or querying of information in conjunction with the display of a different or updated pane of the web-based GUI. A native application-based GUI may include a number of panes accessible on a compatible device (e.g., mobile device for a mobile software application) that receive an information feed. For example, the panes of a native application-based GUI may be populated from an information feed pertaining to the type of application (e.g., an enterprise native application-based GUI may be populated by an information feed provided by managed network 300 via internet 350).

More particularly, native mobile applications are programs specifically designed to execute on the operating system of a mobile device, such as a mobile phone, tablet, smartwatch, or any other type of wireless communication device. Such native applications may be pre-packaged with the device or downloaded to the device at a later time. These applications may allow access to data of a web site or server, and may present this data in a customized fashion on a graphical user interface. This, and the ability for native applications to request specific subsets of the data that is to be presented, results in these applications having numerous advantages over accessing the same data by way of a web browser, such as the ability to display streams of data in a readable fashion regardless or screen size or screen orientation.

As previously discussed, completing enterprise-related tasks and requests can be cumbersome for both experienced and inexperienced users alike. The embodiments herein address these issues by way of a web-based GUI that allows for the configuration of graphical elements, which in turn allows users to view both enterprise-related actions and requests in an organized manner on one pane. Viewing both enterprise-related actions and requests on one pane may be particularly beneficial when accessing the GUI on a mobile device with a small screen because it may remove the need for users to navigate through multiple panes in order to view different types of information.

A large enterprise may have many users connected to managed network 300. These users are typically issued or use standard mobile devices that have limited screen sizes (e.g., 7 inches or less diagonal on mobile devices and 13 inches or less diagonal on tablets). These users may be new-hires that have to complete a number of enterprise-related tasks, including, but not limited to watching training videos, completing human resource forms, and/or setting up direct deposit for paychecks. Alternatively, these users may be existing users that may submit support tickets (incidents) for hardware or software issues they are experiencing.

Generally, users can complete tasks or request services through generic GUIs on their mobile devices that provide the same information to every user. While these GUIs may allow a user to complete tasks or request services, the small screen size of these devices may cause the user to take an inordinate amount of time to navigate to the desired task or service. Part of this is due to the generic nature of the GUI's layout and content.

In order to streamline the experience for an enterprise user, the embodiments herein include GUIs with graphical elements arranged to take account of the small screen size of the device displaying the GUI. This may involve displaying information in the order of most used across part of or the entire enterprise. For example, if users prefer to use a search when looking for tasks or requests, a search bar graphical element may be displayed at the top of an example GUI. Further, graphical elements that represent personalized items for the user, such as tasks and requests, may be less preferred than the search bar graphical element. As such, the graphical elements that represent personalized items may be displayed below the search graphical element. Even further, graphical elements that represent generic items relating to the enterprise may be the least preferred, and thus may be displayed at the bottom of the GUI below the personalized items. While the following example embodiments display the graphical elements in a particular order (e.g., a search bar on top, followed by personalized items in the middle, and generic items on the bottom), the graphical elements can be arranged in any order based on user preference within the particular enterprise associated with managed network 300.

Figure 6A:
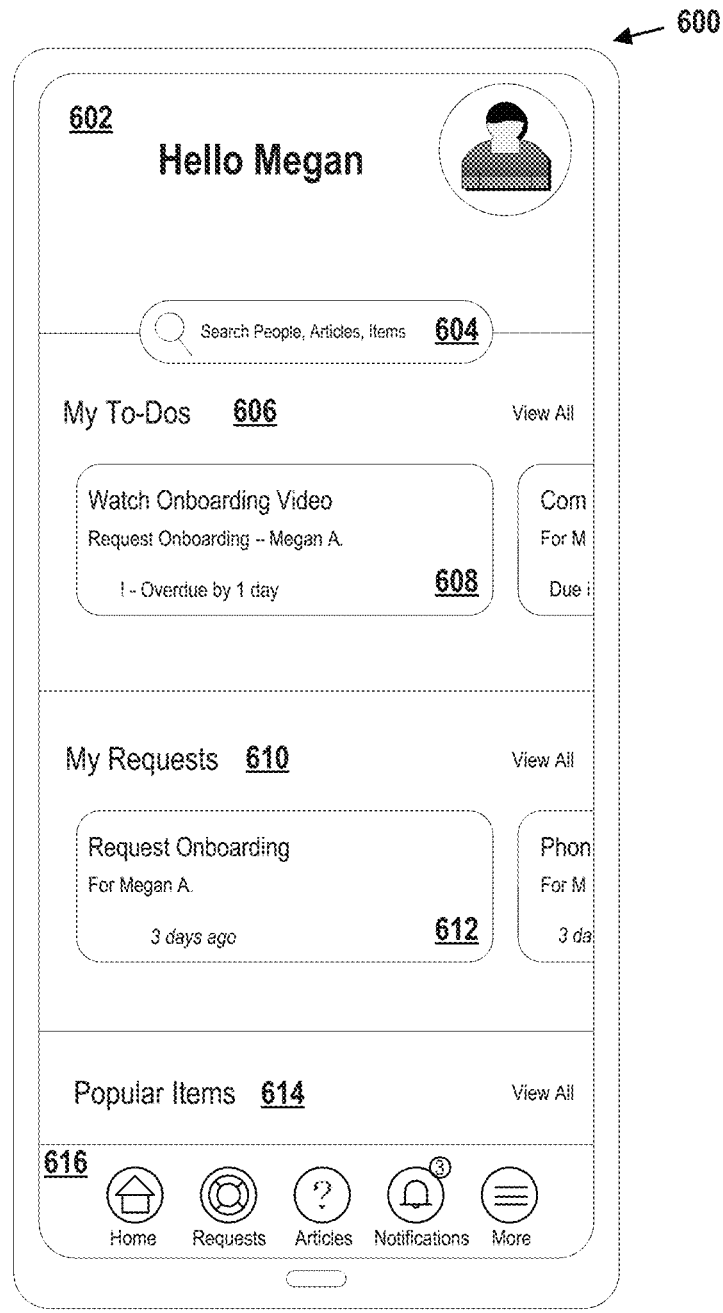
FIG. 6A depicts a home page view of a personalized GUI, in accordance with example embodiments.
Figure 6C:
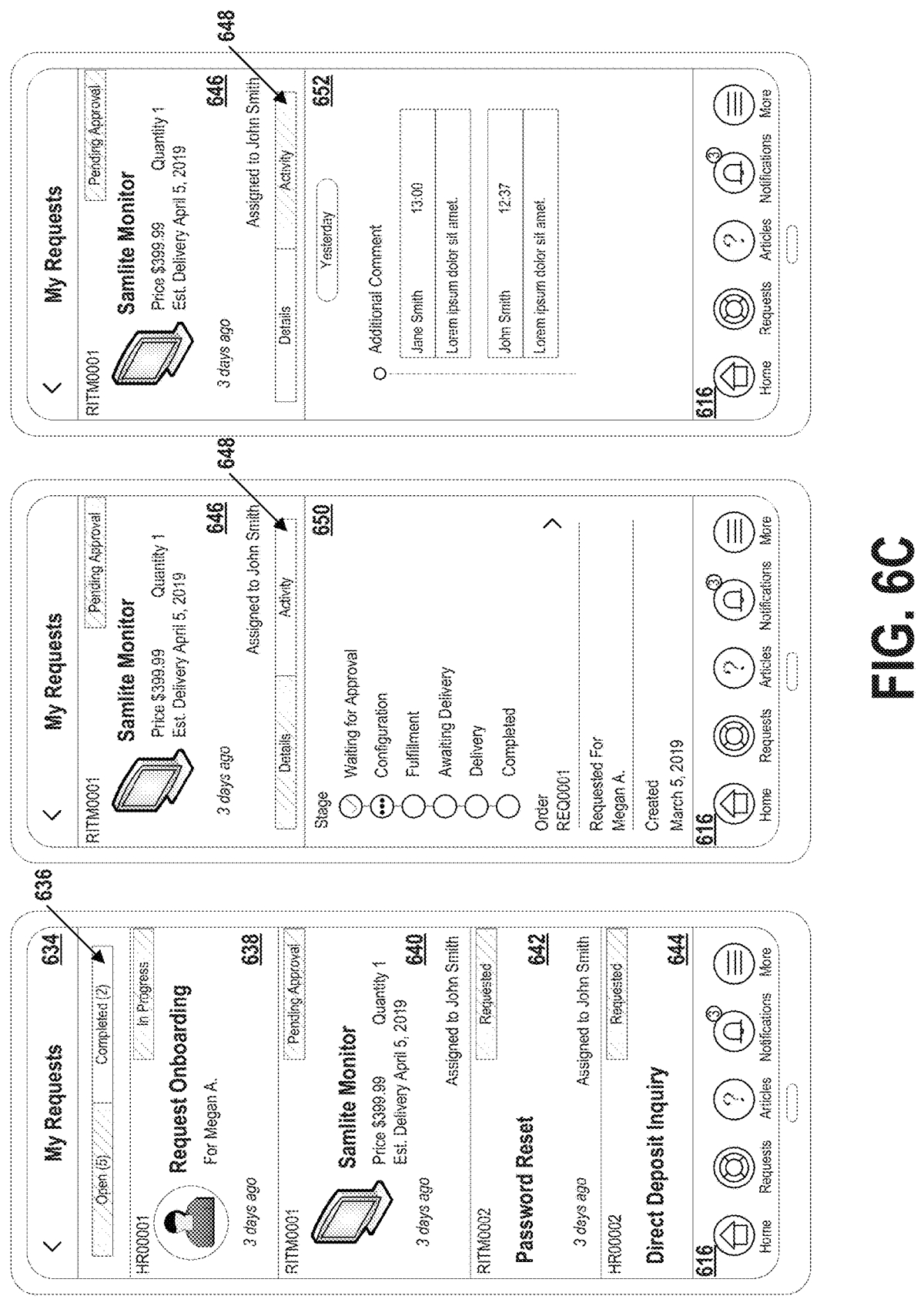

Example panes are shown in FIGS. 6A, 6B, and 6C. These panes may allow a user to easily find and complete a task assigned to them, as well as easily request services or hardware. Other possibilities exist.

FIG. 6A depicts a home page pane of personalized GUI 600 that includes splash screen 602, search bar 604, personalized items 606 and 610, popular items 614, and navigation bar 616. Although FIG. 6A depicts GUI 600 being displayed on a mobile phone device, the GUI panes discussed herein can be displayed as web pages or within native applications on any type of computing device.

Splash screen 602 may include a welcome message to the user accessing personalized GUI 600, as well as information related to the enterprise associated with managed network 300. For example, as shown in FIG. 6A, splash screen 602 displays the message "Hello Megan." Splash screen 602 may include alternative and/or additional information (not shown), such as weather or other location-based information.

Search bar 604 may include a user-definable field that allows a user to enter a string of characters in order to search for information. Once a user enters a string of characters, search bar 604 may be actuatable to cause personalized GUI 600 to display search results relating to the entered string of characters. This may be beneficial as it allows the user to quickly search for the most relevant task, request, or item, without having to navigate through the rest of personalized GUI 600.

Personalized items 606 and 610 may include personalized graphical elements that are specific to the user accessing personalized GUI 600, such as the user's personal tasks and requests. Personalized items 606 include "My To-Dos", which corresponds to enterprise-related tasks that have been assigned to the user. These tasks may include completing training videos and human resource forms (e.g., completing new hire checklists, uploading drivers' licenses, setting up direct deposits, signing non-disclosure agreements, etc.). As shown in FIG. 6A, personalized items 606 includes task 608, which is a user-selectable graphical element that corresponds to a task assigned to the user. Personalized items 610 includes "My Requests", which corresponds to enterprise-related requests that have been submitted by or on behalf of the user. These requests may include things such as requesting new and/or replacement hardware (e.g., new laptops, phones, keyboards, etc.), or requesting services (e.g., training, hardware repair, etc.). As shown in FIG. 6A, personalized items 610 includes request 612, which is a user-selectable graphical element that corresponds to a request submitted by the user accessing personalized GUI 600.

Popular items 614 may include enterprise-related graphical elements that represent tasks or services that are applicable to multiple users within managed network 300. These tasks or services may be crowd-sourced from other users connected to managed network 300 in order to present the user with popular tasks and services. As such, the displayed graphical elements may change based on other users' interactions over time. Further, popular items 614 may be tailored and/or not tailored to the user accessing personalized GUI 600. For example, popular items 614 may be in tailored to the user in the sense that the enterprise-related graphical elements can be associated with an access control or permission list. That is, some users associated with managed network 300 may have special access or permission to certain resources available via personalized GUI 600. In this case, popular items 614 may only include enterprise-related graphical elements that are available to be viewed by the user.

Navigation bar 616 may include various graphical elements and/or buttons that are actuatable to navigate to different panes of personalized GUI 600. As shown in FIG. 6A, navigation bar 616 includes a button for "Home", "Requests", "Articles", "Notifications", and "More". In operation, actuating one of these buttons causes the mobile device to generate and display a graphical user interface associated with the actuated button. For example, if a user selects or actuates the button for "Home", the mobile device may generate and display the home page pane of personalized GUI 600 shown in FIG. 6A. In another example, if the user actuates the button for "Requests", the mobile device may generate and display the graphical user interface shown in FIG. 6B.

After examining the home page pane of personalized GUI 600, a user may decide to view to use search bar 604 to find a desired enterprise-related action. To do this, the user may actuate search bar 604 by touching or clicking search bar 604. Once actuated, the user may enter text on the mobile device, which when entered may generate and display the search results. These search results may be related to the entered text. However, in some situations, a user might want to view the enterprise-related requests assigned to him or her, instead of searching for specific information. In this situation, the user may actuate personalized items 610, labelled "My requests". In response to this actuation, the mobile device may generate and display a custom requests pane of personalized GUI 600, as shown in FIG. 6B.

FIG. 6B depicts a custom requests pane 618 of personalized GUI 600, which includes search bar 620, requests 622, assets 624, recently viewed items and services 626, as well as navigation bar 616.

Search bar 620 may function similarly to search bar 604 of FIG. 6A, but may have access to search results that are limited to enterprise-related items pertaining to user requests. These items may include software or hardware support tickets, training requests, and/or general knowledge requests. Many examples of enterprise-related requests exist.

Requests 622 may include an actuatable graphic element configured to generate a detailed custom requests pane displaying the user's active and/or open requests. The detailed custom requests pane of personalized GUI 600 is illustrated in FIG. 6C.

Assets 624 may include an actuatable graphic element configured to generate a detailed custom assets pane displaying the user's assets in the form of a hardware profile.

Recently viewed items and services 626 may include various actuatable graphical elements corresponding to recently viewed items and services, such as recently viewed items 626A and 626B, and recently viewed services 626C. These recently viewed items and services may have been viewed by a user via one of the other panes of personalized GUI 600 in FIGS. 6A, 6B and/or 6C. Recently viewed items 626A and 626B, and recently viewed services 626C may be actuatable and, when actuated, item 626A may cause the mobile device to generate and display detailed item view 628.

For example, as shown in FIG. 6B, detailed item view 628 displays detailed information relating to recently viewed item 626A, which is a "Samlite Monitor". The detailed information may include a description of the item, various forms and buttons that the user can fill out and toggle to indicate problems with the item, and technical specifications of the item. The detailed information may change depending on the type of recently viewed item or service 626. Once the detailed information is viewed by a user, the user may actuate one of buttons 630 to request the item.

Buttons 630 may include actuatable graphical elements configured to request the particular item shown in detailed item view 628. As shown in FIG. 6B, buttons 630 include an "Add to Cart" and an "Order Now" button. Actuation of buttons 630 may cause the mobile device to generate and display a notification 632 at the top of detailed item view 628.

Notification 632 may include a graphical element configured to display a notification for a short period of time. Notification 632 may also be actuatable and configured to display another pane of personalized GUI 600. For example, as shown in the right pane of FIG. 6B, notification 632 includes the text "Item added to your cart", indicating that the particular item shown in detailed item view 628 has been added to a virtual shopping cart for purchase and/or request. Notification 632 also includes the text "View cart", which may be actuatable and configured to cause the mobile device to generate and display a pane of personalized GUI 600 that shows the items in the user's virtual shopping cart (not shown).

In operation, once an item or service is ordered via the user's virtual shopping cart, the item or service may appear in requests 622. To view the user's requests, requests 622 can be actuated, which may cause the mobile device to generate and display the custom requests pane of personalized GUI 600 shown in FIG. 6C.

FIG. 6C includes custom requests pane 634 of personalized GUI 600, which includes toggle 636, requests 638, 640, 642, and 644, as well as navigation bar 616.

Custom requests pane 634 includes a list of open and completed enterprise-related requests for a particular user. Enterprise-related requests may include actions or items requested by the user. These can include, among other things, training requests, hardware requests, information requests, and human resource requests.

Toggle 636 may include an actuatable graphical element configured to manipulate the information shown in custom requests pane 634. For example, toggle 636 may include options such as "Open" and "Completed". The option for "Open" may cause custom requests pane 634 to display the enterprise-related requests that are incomplete. The option for "Completed" may cause custom requests pane 634 to display the enterprise-related requests that are completed or fulfilled. This may be beneficial for the user as it can show the user which requests have yet to be completed while still allowing the user to view past requests that have been completed.

Requests 638, 640, 642, and 644 may include the active or completed enterprise-related requests that pertain to the user accessing personalized GUI 600, depending on the actuated option in toggle 636. As shown in FIG. 6C, "Open" is selected in toggle 636 (the shading indicates a toggle option is selected), indicating that requests 638, 640, 642, and 644 are still active and not completed. In an example, request 638 may be the enterprise-related request for "Request Onboarding", request 640 may be the enterprise-related request for "Samlite Monitor", request 642 may be the enterprise-related request for "Password Reset", and request 644 may be the enterprise-related request for "Direct Deposit Inquiry". Requests 638, 640, 642, and 644 may include different types of requests. For example, as shown in FIG. 6C, request 638 is a human resources request, which is indicated by the tag HR00001. In another example, request 640 is an item request, which is indicated by the tag RITM0001. Other types of requests may exist. An enterprise manager may determine the types of requests shown in requests 638, 640, 642, and 644 via additional web-based GUIs. Requests 638, 640, 642, and 644 may be actuatable to display more detailed information relating to the request in detailed request view 646.

Detailed request view 646 may include detailed information relating to the actuated request from requests 638, 640, 642, and 644. For example, detailed request view 646 in FIG. 6C depicts detailed information regarding request 640. Detailed request view 646 may also include toggle 648, which switches the displayed view between details 650 and activity 652.

Toggle 648 may include an actuatable graphical element configured to manipulate the information shown in detailed request view 646. For example, Toggle 648 has an option for "Details", and "Activity". Actuation of "Details" may cause detailed request view 646 to display details 650, while actuation of "Activity" may cause detailed request view 646 to display activity 652.

Details 650 may include detailed information relating to the request being displayed in detailed request view 646. This detailed information may include a request number, the identity of the user that submitted the request, the date the request was created, and the progress stage of the request (e.g., waiting for approval, configuration, fulfillment, awaiting delivery, delivery, or completed). As shown in FIG. 6C, details 650 may provide the user with a visual indication of the stage of the request in the form of check marks and ellipses. For example, details 650 shows that the request for the "Samlite Monitor" has been approved and is now in the configuration stage.

Activity 652 may include comments relating to the request being displayed in detailed request view 646. For example, as shown in FIG. 6C, activity 652 shows comments from different users relating to the request. These comments may be submitted from other users responsible for fulfilling the request. Activity 652 may be beneficial to the user that submitted the request because the comments could help explain any delays or problems with the completion of the request.

Turning back to FIG. 6B, in some examples, completion of a request may add an item to assets 624. In these examples, the completed request may include delivery of a new hardware device to the user (e.g., the "Samlite Monitor"). After the request is completed, a user may view the hardware devices by actuating assets 624, which may cause the mobile device to generate and display a custom assets pane of personalized GUI 600 (not shown).

VI. Graphical User Interfaces for Populating the Enterprise-Related Tasks and Actions As described above, enterprise managers may want to configure the types of enterprise-related actions and requests that are shown in personalized GUI 600. For example, an enterprise manager may determine that detailed custom requests pane 634 in FIG. 6C should display incidents and requests interleaved in a chronological fashion based on the ages of the incidents and requests. However, the incidents and requests that pertain to a particular user may contain information found in different database tables, and the fields thereof that can be used to sort this data may differ between the tables.

For example, a user's incidents may be stored in a first database table with a field entitled "date created" representing the time that the incident was created. But the user's requests may be stored in a second database with a field entitled "when requested" representing the time that the request was created. In order for the incidents and request to be displayed in the desired interleaved fashion, these fields must be identified and designated as fields on which to base the interleaved ordering. The embodiments herein include intuitive web-based GUIs to facilitate this type of configuration for a mobile user interface.

Figure 7A:
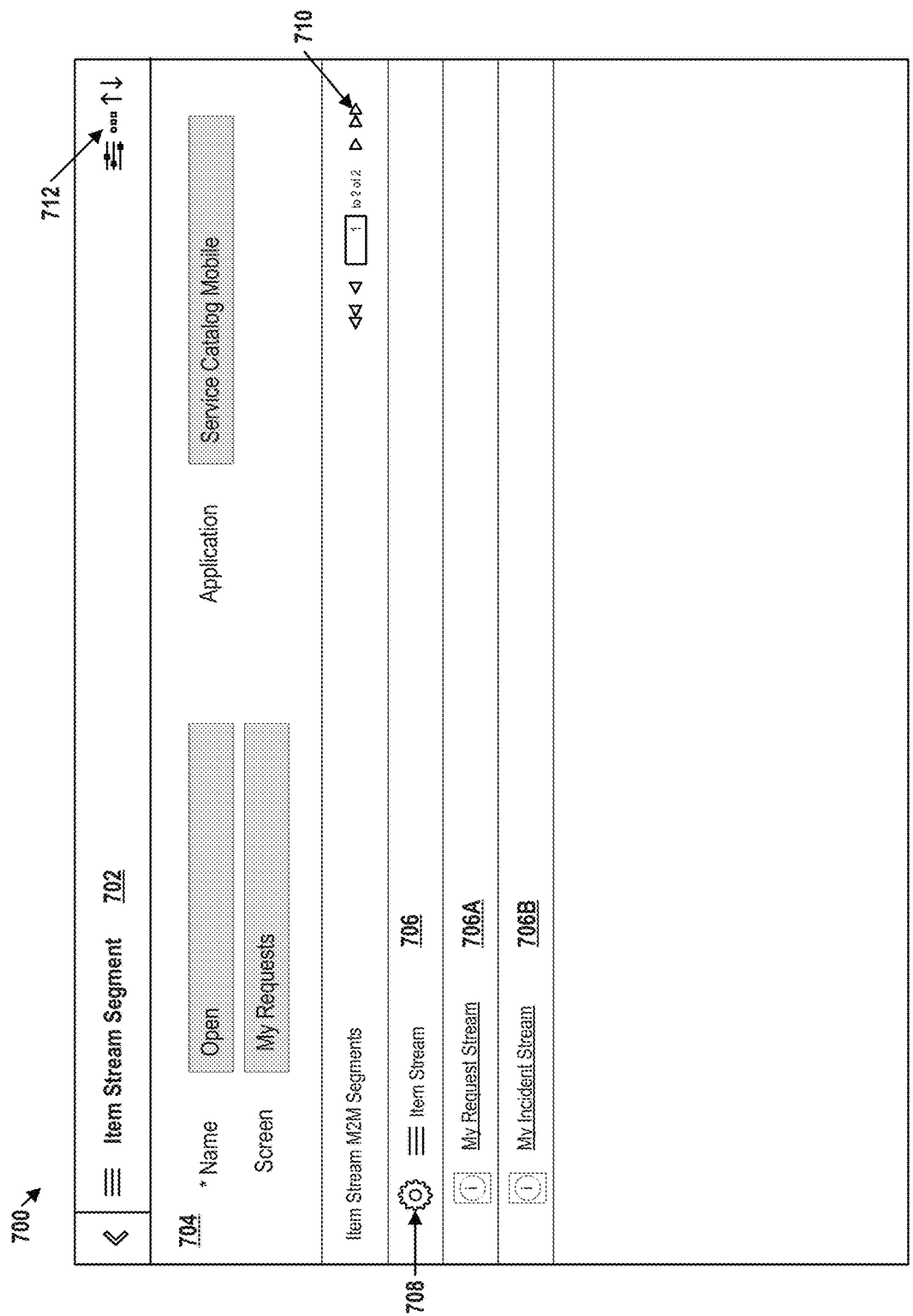
FIG. 7A depicts an item stream segment management pane of an item stream management GUI, in accordance with example embodiments.
Figure 7B:
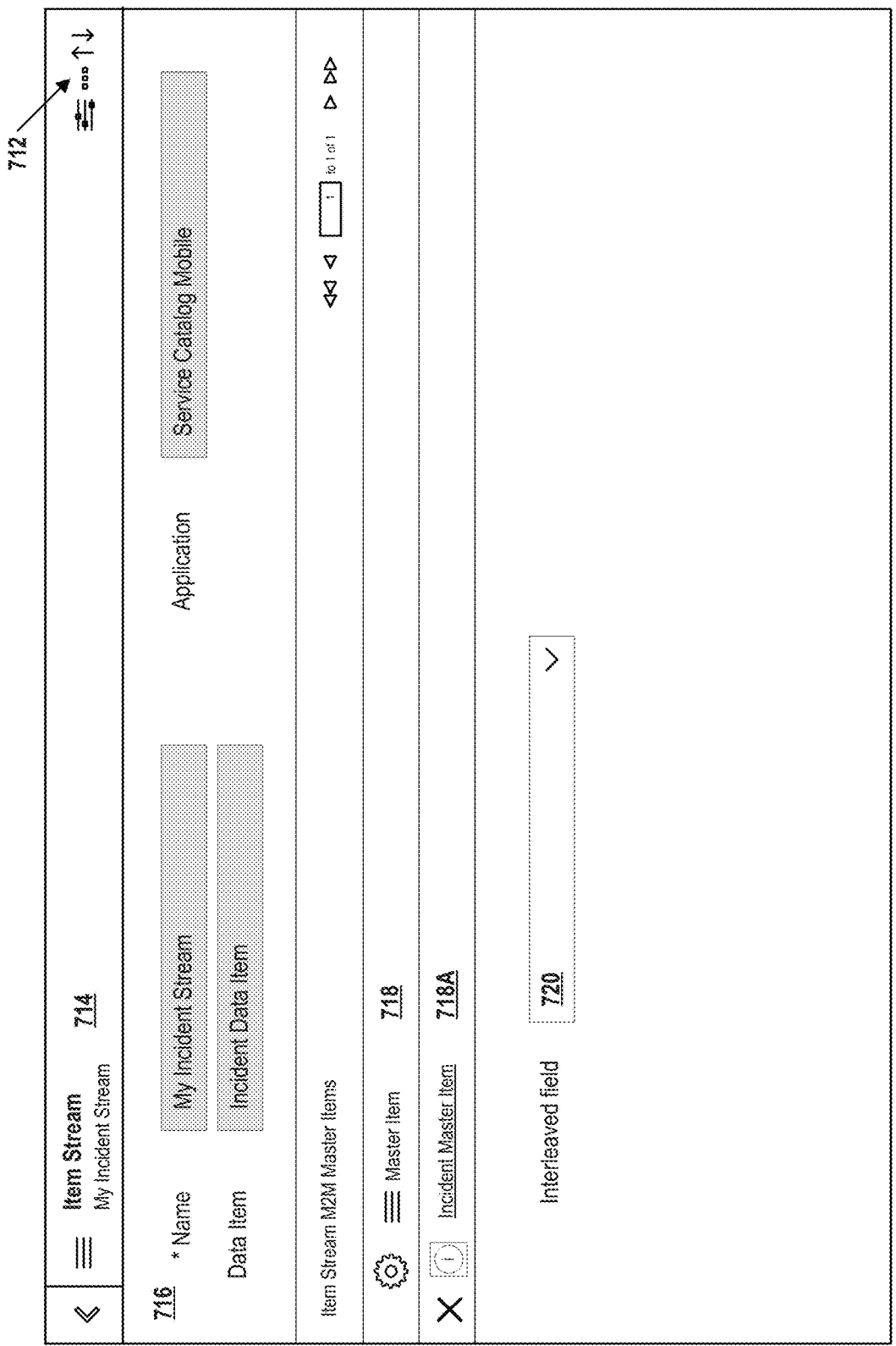
FIG. 7B depicts an item stream management pane of the item stream management GUI, in accordance with example embodiments.
Figure 7C:
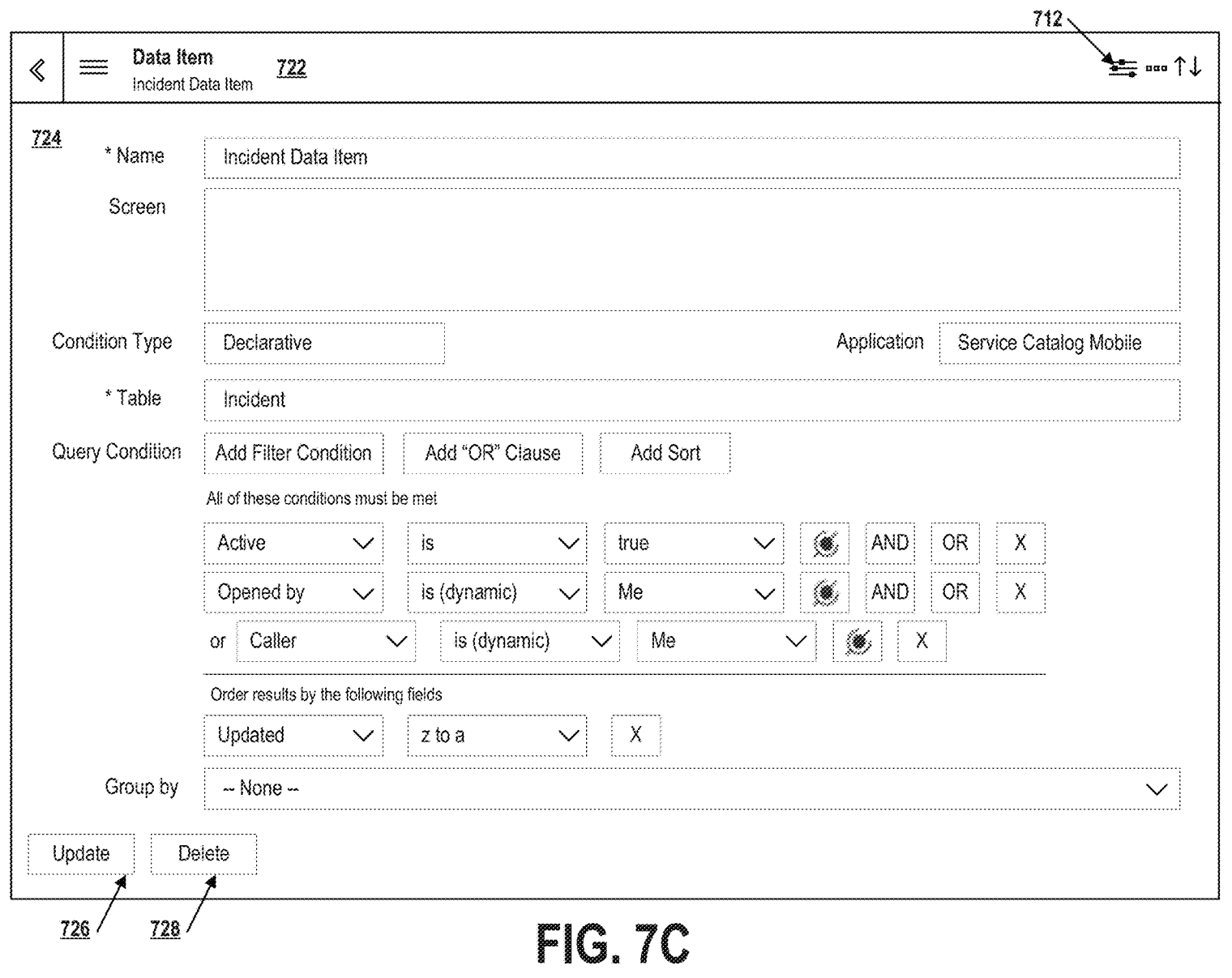
Figure 7D:
FIG. 7D depicts a configured request pane of the personalized GUI, in accordance with example embodiments.

Example panes are shown in FIGS. 7A, 7B, and 7C. These panes may allow an enterprise manager to easily configure a layout or content for personalized GUI 600 by defining the types of enterprise-related information to be displayed to a user within management GUI 700. These panes may also make the enterprise-related information more accessible on a device with a small screen size when viewing personalized GUI 600. An example pane showing a personalized GUI 600 that has been configured via management GUI 700 is shown in FIG. 7D, and will be discussed in more detail below.

FIG. 7A depicts an item stream segment management pane 702 of management GUI 700. Item stream segment management pane 702 may include text fields 704, table 706, configuration button 708, navigation buttons 710, and settings 712.

Text fields 704 may include user-definable fields that indicate customizable aspects of personalized GUI 600. The user-definable fields may include a name of the stream segment being configured, the screen and/or pane of GUI 600 which the stream segment will be displayed, and the software application generating the screen. As shown in FIG. 7A, the name of the stream segment is "Open", the screen of GUI 600 is "My Requests", and the application is "Service Catalog Mobile". In operation, these fields indicate that the enterprise manager is configuring the information to be displayed in the detailed custom requests pane 634 of personalized GUI 600 shown in FIG. 6C.

Table 706 (which is a table displayed on a GUI and is not to be confused with database tables) may include table rows 706A and 706B, which may contain the types of enterprise-related information to be displayed to the user under "My Requests". Table row 706A may include the item stream "My Request Stream", which indicates that the item stream is pointing to a database table that includes requests (e.g., hardware or software requisitions submitted by the user accessing personalized GUI 600). Table row 706B may include the item stream "My Incident Stream", which indicates that the item stream is also pointing to a database table that includes incidents (e.g., IT work orders or IT service requests submitted by the user and related to the operation of the enterprise's managed network). Although not shown, table 706 may include additional item streams depending on the particular needs of the enterprise manager accessing management GUI 700. These additional item streams may include problems (e.g., root-cause issues that may have triggered the creation of one or more incidents), user requirements (e.g., to fill out an HR form), or may be based on or populated by any other data from a database table. Thus, table rows 706A and 706B may be selectable to configure the items that comprise the selected item stream.

Configuration button 708 may be a user-actuatable button that allows an enterprise manager to configure table 706 by adding or removing item streams. In operation, actuating configuration button 708 may cause management GUI 700 to display an additional pane (not shown) that allows for the addition or removal of item streams.

Navigation buttons 710 may be user-actuatable buttons that allow a user to navigate between multiple pages of item streams if all of the item streams are unable to be displayed in table 706.

Settings 712 may include user-actuatable buttons that allow a user to configure display features of management GUI 700. For example, settings 712 may allow an enterprise manager to define the size of the text of, or the amount of information displayed on, the various panes of management GUI 700.

In operation, the enterprise manager may select table row 706B in order to configure the items associated with "My Incident Stream". Upon selection, management GUI 700 may display the item stream management pane 714 as shown in FIG. 7B.

Accordingly, FIG. 7B depicts an item stream management pane 714, which includes text fields 716, table 718, and interleaved field selector 720.

Text fields 716 may include user-definable fields that allow for the configuration of the item streams that make up the item stream segment. The user-definable fields may include a name of the item stream being configured, the data item being used for configuration, and the software application controlling screen of a user's device. As shown in FIG. 7B, the name of the item stream is "My Incident Stream", the data item is "Incident Data Item", and the application is "Service Catalog Mobile". Text fields 716 may be selectable to cause management GUI 700 to display data item management pane 722 as shown in FIG. 7C Table 718 may include table row 718A, which may contain the types of items to be included in "My Incident Stream". Table row 718A may include the item "Incident Master Item", which indicates that there is a primary item used for "My Incident Stream". While FIG. 7B only shows one table row, table 718 is capable of containing any number of customized items in table rows.

Interleaved field selector 720 may include a user-selectable drop-down menu that allows an enterprise manager to sort the items that are being displayed in the detailed custom requests pane 634 of personalized GUI 600 shown in FIG. 6C. Although not shown, interleaved field selector 720 may include options to sort incidents by "Name", "Data Item", "Application", "Class", "Created by", and "Updated". Two different items (e.g., items represented in two different database tables) can be sorted via interleaved field selector 720 if they share a common data type. Common data types may include integers, floating point numbers, strings, dates, etc.

As discussed above, suppose that the enterprise manager wishes to interleave incidents and requests by the "date created" field of the incident table and the "when requested" field of the requests table. The enterprise manager may select the "date created" field using interleaved field selector 720 of item stream management pane 714. The enterprise manager may then navigate back to item stream segment management pane 702, and select table row 706A in order to configure the items associated with "My Request Stream". Upon selection, management GUI 700 may display a variation of item stream management pane 714 as shown in FIG. 7B, but this time for requests. From this variation of item stream management pane 714, the enterprise manager may select the "when requested" field using an interleaved field selector similar to that of interleaved field selector 720. Doing so may cause personalized GUI 600 to display a segment interleaving incidents and requests according to the values of these fields. This may be particularly beneficial because sorting different types of items allows an end-user accessing personalized GUI 600 to quickly identify relevant items in one pane.

After determining how to sort the items in table 718 via interleaved field selector 720, the enterprise manager may want to edit the "Incident Data Item" shown in text fields 716. To accomplish this, the enterprise manager may select "Incident Data Item" in text fields 716, causing management GUI 700 to display data item management pane 722 shown in FIG. 7C.

FIG. 7C depicts data item management pane 722 of management GUI 700, which includes text fields 724, update button 726, and delete button 728.

Text fields 724 may include user-definable fields that configure the items the enterprise manager wants to use in the selected item stream. The user-definable fields may include a name of the item being configured, the screen on which the item is to be displayed, the condition type of the item, the software application generating the screen, the database or table from which the item is being sourced, the query condition of the item, the default order for which to display the item, and the grouping of the item. As shown in FIG. 7C, the name of the item is "Incident Data Item", the screen is blank (default), the condition type is "Declarative", the application is "Service Catalog Mobile", and the table and/or database is "Incident". The query condition fields indicate that the item is included in the item stream when it is active, and (i) opened by the user accessing personalized GUI 600, or (ii) the caller is the user accessing personalized GUI 600. The default order to display items resulting from the query is in reverse alphabetical order by the time the item was last updated, and the item is not configured to be grouped.

Update button 726 may be an actuatable button configured to update the settings of the selected item in line with the information found in text fields 724. In operation, actuating update button 726 may cause the item displayed in text fields 716 in the item stream management pane 714 of management GUI 700 to change based on the information found in text fields 724.

Delete button 728 may be an actuatable button configured to delete the selected item. In operation, actuating delete button 728 may remove the item displayed in text fields 716 in the item stream management pane 714 of management GUI 700.

In operation, once an enterprise manager or equivalent user is finished configuring the item streams via management GUI 700, a configured GUI 750 may be displayed to a user, as shown in FIG. 7D. Configured GUI 750 may be a configured or modified version of personalized GUI 600 described above with respect to FIGS. 6A, 6B, and 6C.

FIG. 7D includes a configured requests pane 752 of configured GUI 750, which may contain the same layout and functionality as personalized GUI 600 shown in FIG. 6C, but configured to display information corresponding to the information provided in management GUI 700.

Configured requests pane 752 includes configured requests and incidents 754, 756, 758, and 760. Configured requests and incidents 754, 756, 758, and 760 may include the active or completed enterprise-related requests and incidents submitted by to the user accessing configured GUI 750. As discussed above, the order in which configured requests and incidents 754, 756, 758, and 760 are displayed is determined by the information input into management GUI 700. Particularly, the incidents and requests are sorted in an interleaved fashion from newest to oldest.

The embodiments described above with respect to FIGS. 6A-7D represent one possible set of examples embodiments. Other example embodiments are possible through the re-ordering, addition, and/or subtraction of panes in any of the embodiments described herein. Further, the panes shown in FIGS. 6A-7D are not limited to being displayed in the order presented as the panes can be displayed in any order or combination.

VII. Example Operations

Figure 8:
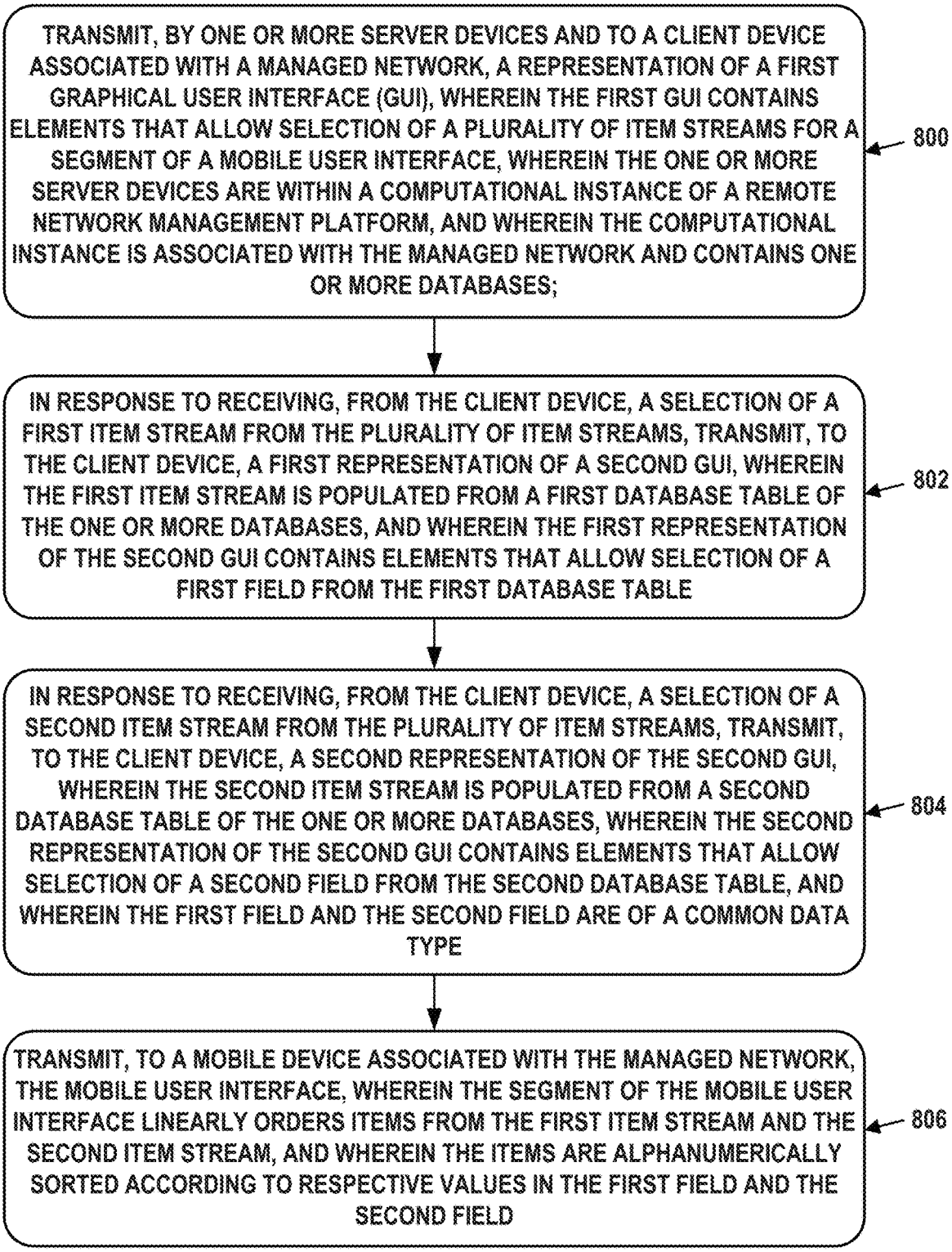
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve transmitting, by one or more server devices and to a client device associated with a managed network, a representation of a first graphical user interface (GUI), where the first GUI contains elements that allow selection of a plurality of item streams for a segment of a mobile user interface, where the one or more server devices are within a computational instance of a remote network management platform, and where the computational instance is associated with the managed network and contains one or more databases.

Block 802 may involve, possibly in response to receiving, from the client device, a selection of a first item stream from the plurality of item streams, transmitting, to the client device, a first representation of a second GUI, where the first item stream is populated from a first database table of the one or more databases, and where the first representation of the second GUI contains elements that allow selection of a first field from the first database table.

Block 804 may involve, possibly in response to receiving, from the client device, a selection of a second item stream from the plurality of item streams, transmitting, to the client device, a second representation of the second GUI, where the second item stream is populated from a second database table of the one or more databases, where the second representation of the second GUI contains elements that allow selection of a second field from the second database table, and where the first field and the second field are of a common data type.

Block 806 may involve transmitting, to a mobile device associated with the managed network, the mobile user interface, where the segment of the mobile user interface linearly orders items from the first item stream and the second item stream, and where the items are alphanumerically sorted according to respective values in the first field and the second field.

In some embodiments, the items include incidents representing hardware or software related to the managed network that is not operating properly, and the items also include requests for hardware or software to be used in conjunction with the managed network. The incidents and requests may have been opened by or on or behalf of a user associated with the mobile device.

In some embodiments, each item in the first item stream has a one-to-one mapping with an entry in the first database table, and where each item in the second item stream has a one-to-one mapping with an entry in the second database table.

Some embodiments may further involve, possibly in response to receiving, from the client device, a selection of a third item stream from the plurality of item streams, transmitting, to the client device, a third representation of the second GUI, where the third item stream is populated from a third database table of the one or more databases, where the third representation of the second GUI contains elements that allow selection of a third field from the third database table, where the third field is also of the common data type, where some of the items are from the third item stream, and where the items are alphanumerically sorted according to respective values in the first field, the second field, and the third field.

In some embodiments, the common data type is a text string, an integer, a floating point number, or a date.

In some embodiments, the mobile user interface is native to the mobile device.

In some embodiments, the mobile user interface is data-defined with each of the items represented as a rectangular cell containing multiple rectangular sub-cells, where sub-cells associated with the items that are from the first item stream respectively contain data from fields of the first database table, and where sub-cells associated with the items that are from the second item stream respectively contain data from fields of the second database table.

In some embodiments, the first representation of the second GUI also contains a selectable representation of the first item stream. These embodiment may also involve, possibly in response to receiving, from the client device, a selection of the first item stream, transmitting, to the client device, a representation of a third GUI, where the representation of the third GUI includes elements that allow specification of (i) a database table from which to populate the first item stream, and (ii) a Boolean filter expression of one or more fields from the database table, and where the Boolean filter expression is applied to entries in the database table in order to generate the first item stream.

Some embodiments may further involve, possibly in response to selection of the first item stream and the second item stream, alphanumerically sorting the items based on the respective values in the first field and the second field so that the items are arranged in ascending or descending order.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising one or more physical server devices within a computational instance of a remote network management platform, wherein the computational instance is associated with a managed network and contains one or more databases, and wherein the one or more physical server devices are configured to:

transmit, to a client device associated with the managed network, a representation of a first graphical user interface (GUI), wherein the first GUI contains a first input field, a second input field, and elements that allow selection of a plurality of item streams;

in response to receiving, from the client device, a selection of a first item stream from the plurality of item streams, select, via an interleaved field selector, items of a common data type from the first item stream, and transmit, to the client device, a first representation of a second GUI, wherein the first item stream comprises a first category of work items populated from a first database table of the one or more databases, and wherein the first representation of the second GUI contains elements that allow selection of a first field from the first database table;

receive the selection of the first field from the client device;

in response to receiving, from the client device, a selection of a second item stream from the plurality of item streams, select, via the interleaved field selector, items of the common data type from the second item stream, and transmit, to the client device, a second representation of the second GUI, wherein the second item stream comprises a second category of work items populated from a second database table of the one or more databases, wherein the second representation of the second GUI contains elements that allow selection of a second field from the second database table, and wherein the first field and the second field are of the common data type;

receive the selection of the second field from the client device;

receive input in the first input field specifying a native software application;

receive input in the second input field specifying a pane;

generate using the specified native software application, a screen comprising a plurality of mobile graphical elements displayed in the specified pane, wherein the plurality of mobile graphical elements comprise:

a plurality of first mobile graphical elements, each first mobile graphical element representing a respective work item of the first category of work items; and a plurality of second mobile graphical elements, each second mobile graphical element representing a respective work item of the second category of work items, wherein the one or more physical server devices are configured to sort the plurality of first mobile graphical elements and the plurality of second mobile graphical elements in an interleaved fashion, according to values of the common data type in the selected first field and the selected second field; and transmit, to a mobile device, a representation of the native mobile application, wherein the plurality of mobile graphical elements are configured for interaction by a user of the mobile device via the native mobile application.

2. The computing system of claim 1, wherein the first category of work items include incidents representing hardware or software related to the managed network that is not operating properly, and wherein the second category of work items include requests for hardware or software to be used in conjunction with the managed network.

3. The computing system of claim 2, wherein the incidents and requests were opened by or on or behalf of the user associated with the mobile device.

4. The computing system of claim 1, wherein each item in the first item stream has a one-to-one mapping with an entry in the first database table, and wherein each item in the second item stream has a one-to-one mapping with an entry in the second database table.

5. The computing system of claim 1, wherein the one or more physical server devices are configured to:

in response to receiving, from the client device, a selection of a third item stream from the plurality of item streams, transmit, to the client device, a third representation of the second GUI, wherein the third item stream comprises a third category of work items populated from a third database table of the one or more databases, wherein the third representation of the second GUI contains elements that allow selection of a third field from the third database table, and wherein the third field is of the common data type; and sort a plurality of third mobile graphical elements representative of the third category of work items in the interleaved fashion with the plurality of first mobile graphical elements and the plurality of second mobile graphical elements.

6. The computing system of claim 1, wherein the native mobile application is data-defined with each of the plurality of mobile graphical elements represented as a rectangular cell containing multiple rectangular sub-cells, wherein sub-cells of the plurality of first mobile graphical elements contain data from fields of the first database table, and wherein sub-cells of the plurality of second mobile graphical elements contain data from fields of the second database table.

7. The computing system of claim 1, wherein the first representation of the second GUI contains a selectable representation of the first item stream, and wherein the one or more physical server devices are configured to:

in response to receiving, from the client device, a selection of the first item stream, transmit, to the client device, a representation of a third GUI, wherein the representation of the third GUI includes elements that allow specification of (i) a database table from which to populate the first item stream, and (ii) a Boolean filter expression of one or more fields from the database table, and wherein the Boolean filter expression is applied to entries in the database table in order to generate the first item stream.

8. The computing system of claim 1, wherein the one or more physical server devices are configured to:

in response to selection of the first item stream and the second item stream, alphanumerically sort the items based on the respective values in the first field and the second field so that the items are arranged in ascending or descending order.

9. The computing system of claim 1, wherein the plurality of mobile graphical elements are displayed via the native mobile application in an order arranged by the user associated with the mobile device.

10. The computing system of claim 1, wherein the plurality of mobile graphical elements are displayed via the native mobile application in an order arranged by a user of the client device.

11. A computer-implemented method comprising:

transmitting, by one or more physical server devices and to a client device associated with a managed network, a representation of a first graphical user interface (GUI), wherein the first GUI contains a first input field, a second input field, and elements that allow selection of a plurality of item streams, wherein the one or more physical server devices are within a computational instance of a remote network management platform, and wherein the computational instance is associated with the managed network and contains one or more databases;

in response to receiving, from the client device, a selection of a first item stream from the plurality of item streams, selecting, via an interleaved field selector, items of a common data type from the first item stream, and transmitting, to the client device, a first representation of a second GUI, wherein the first item stream comprises a first category of work items populated from a first database table of the one or more databases, and wherein the first representation of the second GUI contains elements that allow selection of a first field from the first database table;

receiving the selection of the first field from the client device;

in response to receiving, from the client device, a selection of a second item stream from the plurality of item streams, selecting, via the interleaved field selector, items of the common data type from the second item stream, and transmitting, to the client device, a second representation of the second GUI, wherein the second item stream comprises a second category of work items populated from a second database table of the one or more databases, wherein the second representation of the second GUI contains elements that allow selection of a second field from the second database table, and wherein the first field and the second field are of the common data type;

receiving the selection of the second field from the client device;

receiving input in the first input field specifying a native software application;

receiving input in the second input field specifying a pane;

generating using the specified native software application, a screen comprising a plurality of mobile graphical elements displayed in the specified pane, wherein the plurality of mobile graphical elements comprise:

a plurality of first mobile graphical elements, each first mobile graphical element representing a respective work item of the first category of work items; and a plurality of second mobile graphical elements, each second mobile graphical element representing a respective work item of the second category of work items, wherein the plurality of first mobile graphical elements and the plurality of second mobile graphical elements are sorted in an interleaved fashion, according to values of the common data type in the selected first field and the selected second field; and transmitting, to a mobile device, a representation of the native mobile application, wherein the plurality of mobile graphical elements are configured for interaction by a user of the mobile device via the native mobile application.

12. The computer-implemented method of claim 11, wherein the first category of work items include incidents representing hardware or software related to the managed network that is not operating properly, and wherein the second category of work items include requests for hardware or software to be used in conjunction with the managed network.

13. The computer-implemented method of claim 11, wherein each item in the first item stream has a one-to-one mapping with an entry in the first database table, and wherein each item in the second item stream has a one-to-one mapping with an entry in the second database table.

14. The computer-implemented method of claim 11, comprising:
in response to receiving, from the client device, a selection of a third item stream from the plurality of item streams, transmitting, to the client device, a third representation of the second GUI, wherein the third item stream comprises a third category of work items populated from a third database table of the one or more databases, wherein the third representation of the second GUI contains elements that allow selection of a third field from the third database table, and wherein the third field is of the common data type; and
wherein a plurality of third mobile graphical elements representative of the third category of work items are sorted in the interleaved fashion with the plurality of first mobile graphical elements and the plurality of second mobile graphical elements.

15. The computer-implemented method of claim 11, wherein the common data type is a text string, an integer, a floating point number, or a date.

16. The computer-implemented method of claim 11, wherein the native mobile application is data-defined with each of the plurality of mobile graphical elements represented as a rectangular cell containing multiple rectangular sub-cells, wherein sub-cells of the plurality of first mobile graphical elements contain data from fields of the first database table, and wherein sub-cells of the plurality of second mobile graphical elements contain data from fields of the second database table.

17. The computer-implemented method of claim 11, wherein the first representation of the second GUI contains a selectable representation of the first item stream, comprising:
in response to receiving, from the client device, a selection of the first item stream, transmitting, to the client device, a representation of a third GUI, wherein the representation of the third GUI includes elements that allow specification of (i) a database table from which to populate the first item stream, and (ii) a Boolean filter expression of one or more fields from the database table, and wherein the Boolean filter expression is applied to entries in the database table in order to generate the first item stream.

18. The computer-implemented method of claim 11, comprising:
in response to selection of the first item stream and the second item stream, alphanumerically sorting the items based on the respective values in the first field and the second field so that the items are arranged in ascending or descending order.

19. An article of manufacture including a non-transitory computer-readable medium, having stored thereon program instructions that, upon execution by a computing system, cause the computing system to perform operations comprising:
transmitting, from a computational instance to a client device associated with a managed network, a representation of a first graphical user interface (GUI), wherein the first GUI contains a first input field, a second input field, and elements that allow selection of a plurality of item streams, and wherein the computational instance is associated with the managed network and contains one or more databases;
in response to receiving, from the client device, a selection of a first item stream from the plurality of item streams, selecting, via an interleaved field selector, items of a common data type from the first item stream, and transmitting, to the client device, a first representation of a second GUI, wherein the first item stream comprises a first category of work items populated from a first database table of the one or more databases, and wherein the first representation of the second GUI contains elements that allow selection of a first field from the first database table;
receiving the selection of the first field from the client device;
in response to receiving, from the client device, a selection of a second item stream from the plurality of item streams, selecting, via the interleaved field selector, items of the common data type from the second item stream, and transmitting, to the client device, a second representation of the second GUI, wherein the second item stream comprises a second category of work items populated from a second database table of the one or more databases, wherein the second representation of the second GUI contains elements that allow selection of a second field from the second database table, and wherein the first field and the second field are of a common data type;
receiving the selection of the second field from the client device;
receiving input in the first input field specifying a native software application;
receiving input in the second input field specifying a pane;
generating using the specified native software application, a screen comprising a plurality of mobile graphical elements displayed in the specified pane, wherein the plurality of mobile graphical elements comprise:
a plurality of first mobile graphical elements, each first mobile graphical element representing a respective work item of the first category of work items; and
a plurality of second mobile graphical elements, each second mobile graphical element representing a respective work item of the second category of work items, wherein the plurality of first mobile graphical elements and the plurality of second mobile graphical elements are sorted in an interleaved fashion, according to values of the common data type in the selected first field and the selected second field; and transmitting, to a mobile device, a representation of the native mobile application, wherein the plurality of mobile graphical elements are configured for interaction by a user of the mobile device via the native mobile application.

\* \* \* \* \*